United States Patent
Merrill

(10) Patent No.: US 11,192,401 B2
(45) Date of Patent: *Dec. 7, 2021

(54) SPINDLE SLEEVE WITH SLEEVE WASHER FOR ROTATIONAL ALIGNMENT

(71) Applicant: Compagnie Generale des Etablissements Michelin, Clermont-Ferrand (FR)

(72) Inventor: Zachary Alexander Merrill, Greenville, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 599 days.

This patent is subject to a terminal disclaimer.

(21) Appl. No.: 16/094,295

(22) PCT Filed: May 26, 2017

(86) PCT No.: PCT/US2017/034771
§ 371 (c)(1),
(2) Date: Oct. 17, 2018

(87) PCT Pub. No.: WO2017/210127
PCT Pub. Date: Dec. 7, 2017

(65) Prior Publication Data
US 2019/0126678 A1    May 2, 2019

Related U.S. Application Data

(63) Continuation of application No. PCT/US2016/035046, filed on May 31, 2016.

(51) Int. Cl.
*B60B 27/00* (2006.01)
*B60B 27/02* (2006.01)
*B62D 17/00* (2006.01)

(52) U.S. Cl.
CPC ...... *B60B 27/0078* (2013.01); *B60B 27/0047* (2013.01); *B60B 27/02* (2013.01);
(Continued)

(58) Field of Classification Search
CPC . B60B 27/0078; B60B 27/02; B60B 27/0047; B60B 27/0021; B60B 27/0026; B62D 17/00
See application file for complete search history.

(56) References Cited

U.S. PATENT DOCUMENTS 5,197,786 A      3/1993  Eschenburg
10,124,829 B2 *  11/2018 Merrill .................. F16D 65/22
(Continued)

OTHER PUBLICATIONS

European Patent Office; International Search Report and Written Opinion for patent application PCT/US2016/035046; dated Feb. 28, 2017; Publisher: European Patent Office, Rijswijk, Netherlands, pp. 1-9, enclosed.

(Continued)

*Primary Examiner* — Jason R Bellinger
(74) *Attorney, Agent, or Firm* — Neal P. Pierotti

(57) ABSTRACT

An apparatus for a vehicle is provided that includes an axle with a keyway. A spindle sleeve is present that has a spindle sleeve inner surface axis coaxial with the axis of the axle. A spindle sleeve outer surface axis is not coaxial with the axis of the axle, and the spindle sleeve has a sleeve washer that has a keyway tab. A retaining nut is in selective rotating communication with the sleeve washer such that rotation of the retaining nut is communicated to the sleeve washer to cause the spindle sleeve to rotate relative to the axle when the retaining nut is in rotating communication with the sleeve washer. Rotation of the retaining nut is not communicated to the sleeve washer to cause the spindle sleeve to rotate relative to the axle when the retaining nut is not in rotating communication with the sleeve washer.

13 Claims, 8 Drawing Sheets

(52) U.S. Cl.
CPC .......... *B62D 17/00* (2013.01); *B60G 2200/46* (2013.01); *B60G 2200/462* (2013.01)

(56) References Cited

U.S. PATENT DOCUMENTS

| | | | |
|---|---|---|---|
| 10,363,962 B2 * | 7/2019 | Merrill | .................... F16D 65/09 |
| 2007/0052287 A1 | 3/2007 | White | |
| 2011/0291467 A1 | 12/2011 | Severini | |
| 2017/0240206 A1 | 8/2017 | Merrill | |
| 2019/0270339 A1 * | 9/2019 | Merrill | ................. B60B 27/001 |
| 2019/0344618 A1 * | 11/2019 | Choi | ................... B60B 27/0005 |

OTHER PUBLICATIONS

European Patent Office; International Search Report and Written Opinion for patent application PCT/US2017/034771; dated Aug. 10, 2017; Publisher: European Patent Office, Rijswijk, Netherlands, pp. 1-9, enclosed.

* cited by examiner

SPINDLE SLEEVE WITH SLEEVE WASHER FOR ROTATIONAL ALIGNMENT

CROSS-REFERENCE TO RELATED APPLICATIONS

The present application is a 35 U.S.C. § 371 application of PCT/US17/34771 filed on May 26, 2017 and entitled "Spindle Sleeve With Sleeve Washer for Rotational Alignment." PCT/US17/34771 claims the benefit of PCT/US16/35046 filed on May 31, 2016 and entitled "Spindle Sleeve With Sleeve Washer for Rotational Alignment." PCT/US17/34771 and PCT/US16/35046 are both incorporated by reference herein in their entireties for all purposes.

FIELD OF THE INVENTION

The subject matter of the present invention relates to wheels that include a spindle sleeve device for imparting camber and/or toe to the wheel hub of the vehicle. More particularly, the present application involves an apparatus that may include a wheel hub assembly with an alignment correction spindle sleeve and a mechanism for external rotational manipulation of the spindle sleeve within the hub in order that the installer may conveniently cause rotation of the spindle sleeve within the hub. This may be done for the purpose of achieving proper rotational positional indexing of the spindle sleeve so that the apparatus may be properly indexed onto the axle and engaged to its keyway.

BACKGROUND OF THE INVENTION

The alignment of a vehicle's wheel plane relative to the path traveled by the vehicle affects not only the handling of the vehicle but also affects the wear on the tires. As used herein, alignment refers to camber, toe, and thrust. Camber is the angle between the vertical axis of the wheel and the vertical axis of the vehicle. Positive camber refers to an angle where the top of the wheel is farther away from the center of vehicle than the bottom of the wheel. Negative camber refers to an angle where the bottom of the wheel is farther away from center of the vehicle than the top. Generally speaking, camber changes of even a fourth of one degree can impact tire wear. Abnormal tire wear has been observed in certain applications with even smaller camber angles changes. Toe is the angle each wheel makes with the longitudinal axis of the vehicle. Positive toe, also referred to as toe in, is a condition where the front of the wheel is pointing in or towards the center line of the vehicle. Negative toe, also referred to as toe out, is a condition where the front of the wheel points out or away from the center line of the vehicle. Generally speaking, toe changes of even one-tenth of a degree can have an impact on tire wear. Thrust is the resulting direction of travel of an axle as opposed to the direction that might be expected from the orientation of the tires on the axle.

When a typical axle is installed under a vehicle (used herein to refer to both motorized vehicles as well as trailers) and placed into normal operation under typical loading conditions, the camber does not remain at zero. The axle under load, although quite rigid, does flex. The flexing of the axle occurs because the suspension is attached to the axle at load transfer points which are significantly inboard of the ends of the axle, but the tires support the weight of the vehicle by means of attachment points which are relatively near the outboard ends of the axle. As a result of this geometry, the weight of the vehicle imposes a bending moment on the axle which in turn causes upward deflection of the ends of the axle resulting in the tires presenting a slight negative camber. As the load increases, the more negative the camber becomes. Once the weight is removed, the axle may recover and again affect the alignment of the wheels. Because of factors such as the additional costs and amount of material that would be required, increasing the stiffness of the axle to resolve camber issues may not be practical.

Even with the same amount of camber on each axle spindle, axle camber affects the tires differently depending on their individual wheel end position on the vehicle because most road surfaces are not flat transversely across the road. When a typical tandem axle vehicle (tractor or trailer) turns, the dynamics of the vehicle favor lateral grip by the forward axle tires. As a result the pivot point of the vehicle shifts toward the forward axle tires and the rear axle tires will tend to have greater slip laterally as the vehicle negotiates a turn maneuver. For this reason, the rear tires on a tandem axle pair receive more scrub and have a faster wear rate than the tires on the forward axle. Scrub tends to arrest the development of irregular wear and thus the rear tires usually are less affected by the camber issue than are the tires on the forward axle. So as a consequence, the tire irregular wear issue is usually worst on the inboard surface of the left front tire. Next worst is the left rear tire. The right front tire comes next but is sometimes similar in severity to the left rear. The most even wear usually is found on the rear right tire depending upon the particular application, load, and routes normally traveled. It should be obvious that in countries such as Australia, where drivers drive on the left side of the road instead of the right side, the above would be reversed.

One mechanism of adjusting axial alignment involves a system that includes a spindle sleeve that has an outer surface about a first axis of revolution and an inner surface about a second axis of revolution at an angle to the first axis. The predetermined angle may be in a vertical direction to induce a change in camber, in a horizontal direction to induce a change in toe, or a combination thereof. The wheel can thus be set at an angle to the spindle, but doing so requires a means by which the spindle sleeve can be correctly rotationally oriented on the axle. If the spindle sleeve is not properly oriented, the desired camber and/or toe angle will not be realized. The spindle sleeve may be provided to the installer contained within a set of bearings and a hub, and thus may not be accessible for rotation. As such, a mechanism of allowing the spindle sleeve to rotate relative to the axle to allow the spindle sleeve to be properly oriented on the axle would be beneficial.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
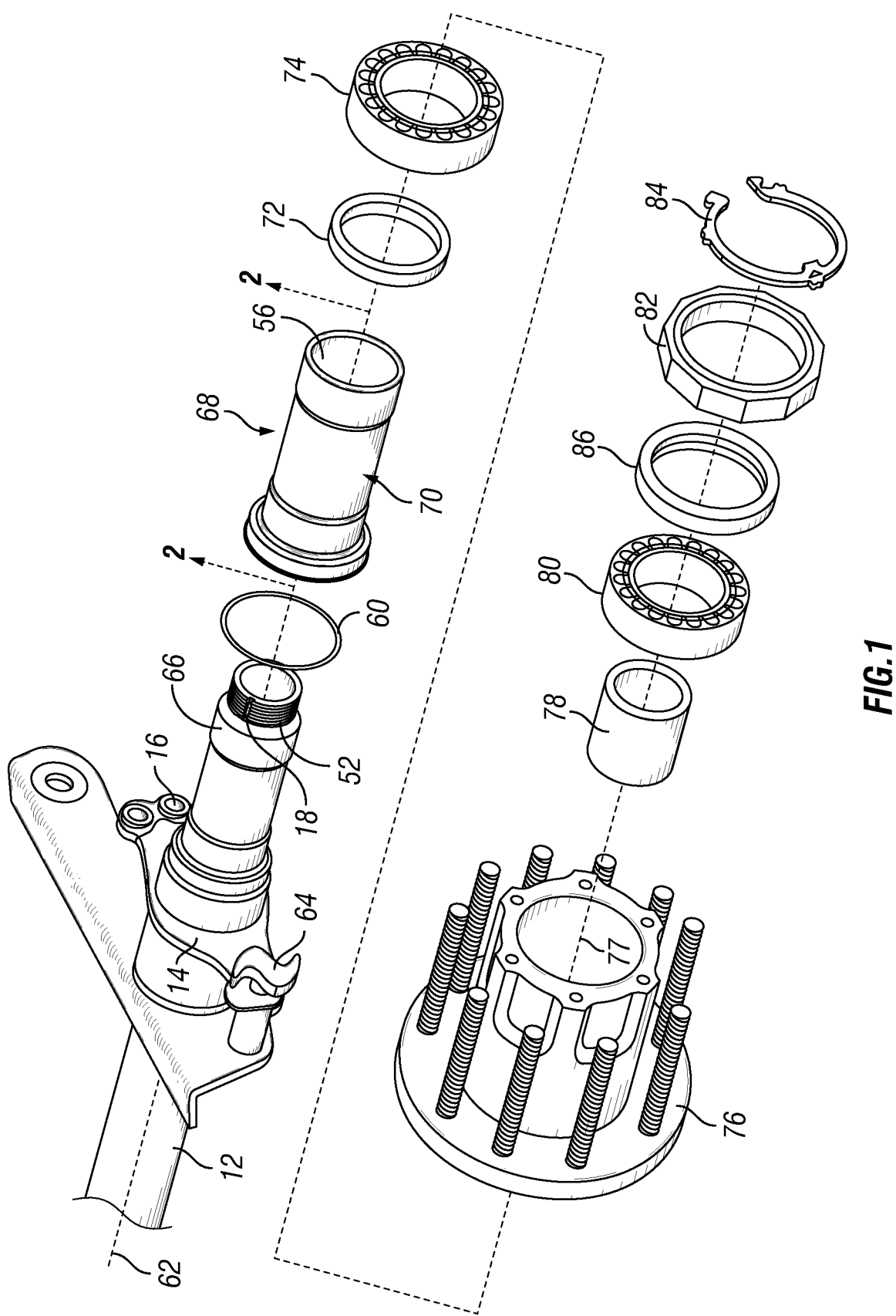
FIG. 1 is an exploded perspective view of the rear outboard side of the assembly of axle, spindle, spindle sleeve, brake mounting plate and spindle nut.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The following terms are defined as follows for this disclosure:

"Axial direction" refers to a direction parallel to the axis of rotation of for example, the hub or the wheel as it travels along a road surface.

"Radial direction" refers to a direction that is orthogonal to the axial direction and extends in the same direction as any radius that extends orthogonally from the axial direction.

"Toe" means the angle of the equatorial plane of the tire with respect to the longitudinal axis of the vehicle.

"Camber" means the angle of the equatorial plane of the tire with respect to the vertical axis of the vehicle.

"Vehicle" includes motorized vehicles and non-motorized vehicles including trailers.

An apparatus 10 is provided that may include a wheel hub assembly that includes an alignment correction spindle sleeve 68 and a mechanism for external rotational manipulation of the spindle sleeve 68 within the hub 76 in order that the installer may conveniently cause rotation of the spindle sleeve 68 within the hub 76. This may be done for the purpose of achieving proper rotational positional indexing of the spindle sleeve 68 so that the apparatus 10 may be properly indexed onto the axle 12 and engaged to its keyway 18.

FIG. 1 provides an embodiment of an apparatus for adjusting the alignment of the axis of rotation of a hub 76 relative to a spindle 66 attached at the end of an axle 12. The spindle 66 is a portion of the axle 12 and may be integrally formed with the axle 12 or a separate piece carried on the axle 12. The hub 76 is retained on the axle 12 usually by way of an axle nut, also referred to as a spindle nut 82, which engages a threaded end of the spindle 66. In this particular embodiment, the spindle 66 and hub 76 are typical to what may be observed on a heavy vehicle such as a truck trailer, but it should be understood that the invention disclosed could be used with other vehicle types.

Figure 2:
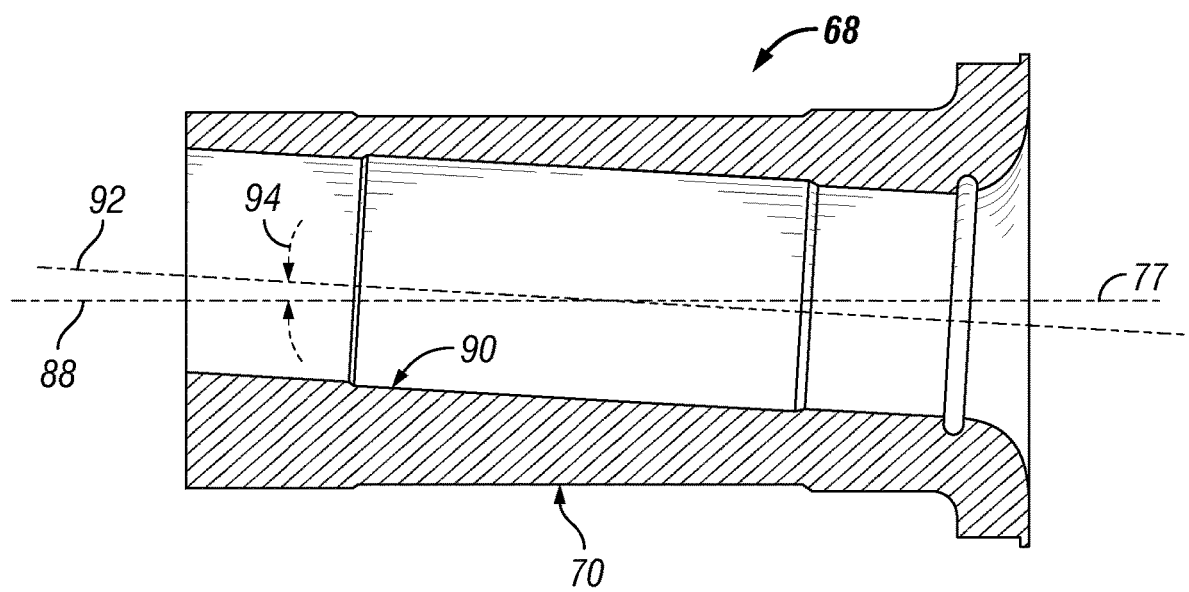
FIG. 2 is a cross-sectional view of the spindle sleeve taken along line 2-2 in FIG. 1.

The spindle 66 has an outer surface of revolution centered upon an axis 62 of the axle 12. The spindle 66 can be mounted to the axle 12 in a variety of manners in accordance with various exemplary embodiments. A spindle sleeve 68, shown in cross-section in FIG. 2, possessing a spindle sleeve inner surface 90 is machined to a diameter so as to fit over the outer surface of the spindle 66. The spindle sleeve inner surface 90 is a generally cylindrical surface of revolution about a spindle sleeve inner surface axis 92. When the spindle sleeve 68 is mated with the spindle 66, the spindle axis which is the same as the axis 62 of the axle 12 and the spindle sleeve inner surface axis 92 are positionally and angularly aligned to one another such that the axes 62, 92 are geometrically the same and are coaxial.

The spindle sleeve 68 possesses a spindle sleeve outer surface 70 with an outer surface of revolution about a spindle sleeve outer surface axis 88 which is oriented at a predetermined angle and position relative to the spindle sleeve inner surface axis 92. In this regard, the spindle sleeve outer surface axis 88 and the spindle sleeve inner surface axis 92 are oriented at an angle 94 to one another. This predetermined angle 94 may be in a vertical direction (inducing a positive or negative change in camber) or horizontal direction (inducing a positive or negative change in toe) or a combination thereof (inducing a positive or negative change in camber and inducing a positive or negative change in toe). It should be appreciated that the value of the difference in angle between the spindle sleeve outer surface axis 88 and the spindle sleeve inner surface axis 92 may be nonzero when viewed in a particular direction. For example the difference in angle may be zero in the horizontal where no change in toe is occurring while having a positive or negative change in angle in the vertical direction where a change in camber is occurring. The angle between the spindle sleeve inner surface axis 92 and the spindle sleeve outer surface axis 88 is chosen depending upon the desired adjustment of the camber, toe and thrust angle of the hub 76 (and attached wheel).

The vertical and horizontal placement and the angular alignment of the spindle sleeve outer surface axis 88 relative to the spindle sleeve inner surface axis 92 is limited to the thickness of the spindle sleeve 68 walls. The walls must be sufficiently thick so as not to deform during handling of the spindle sleeve 68, installation of the spindle sleeve 68 upon the spindle 66, or operation of the vehicle as the loads are transmitted from the vehicle through the spindle 66, spindle sleeve 68, wheel bearings, hub 76 and to the road surface.

With reference back to FIG. 1, the hub 76 is rotationally mounted onto the exterior surface of the spindle sleeve 68. This rotational mounting may be accomplished by the use of one or more bearings between the hub 76 and the spindle sleeve 68 in the radial direction. The bearing arrangement can include races 74 and 80 on the spindle sleeve outer surface 70 and spaced from one another a distance in the axial direction of the spindle sleeve inner surface axis 92 by a bearing spacer 78. A washer 86 can be located outboard of and can engage the bearing race 80. A seal 72 may be pressed on the inboard portion of the spindle sleeve 68 and inboard portion of the hub 76. The seal 72 illustrated is a unitized type seal, but other seal types are possible such as non-unitized positive contact lip seals. Other components can be included in the bearing arrangement, and the hub 76 can be placed into rotating engagement with the spindle sleeve 68 in a variety of manners in accordance with other exemplary embodiments.

The spindle 66 may be welded to an end of an axle tube of the axle 12 and when the suspension system is unloaded, the axes of the spindles 66 on each side are aligned and have zero degrees of camber and zero degrees of toe. As discussed above, the vehicle dynamics and loads placed upon the axle 12 by the vehicle weight and cargo deflect the axle 12 causing the spindles 66 to take on a small amount of camber. The spindle sleeve 68 allows adjustment of the wheel camber, toe and thrust angles by a desired amount. An O-ring 60 can be present to seal the spindle sleeve 68 engagement with the axle 12 to prevent dirt from getting into the interior of the hub 76.

A keyway 18 may be positioned on the rear end of the axle 12 and may extend into a spindle wall portion and may extend in length in the direction of the axis 62. The keyway 18 allows a spindle nut lock ring 84 to prevent the spindle nut 82 from rotating relative to the spindle 66.

The spindle nut 82 shown here is a locking spindle nut having a spindle nut lock ring 84. Other spindle nuts 82 may be used, including a castle nut, a nut and retaining washer, or dual nut and a lock plate. It should also be understood that such spindle nuts may work in conjunction with a cotter pin inserted through an aperture on the spindle 66 instead of a keyway as described. The wheel assembly also includes a pair of brake pin apertures 16 for mounting brake frictional components thereon that are actuated by the cam 64 in order to engage the hub 76 for braking. When the angle of the camber and toe is changed, the angle that the brake components attached to the axle 12 change with respect to the brake components attached to the hub 76. The axis 77 of the hub 76 is aligned with the spindle sleeve outer surface axis 88 and so that these two axes 77, 88 are at an angle to the axis 62 of the axle 12. Adjustments may be made to ensure the brake components properly align with one another due to the misalignment of the axis 62 and axis 77.

Figure 3:
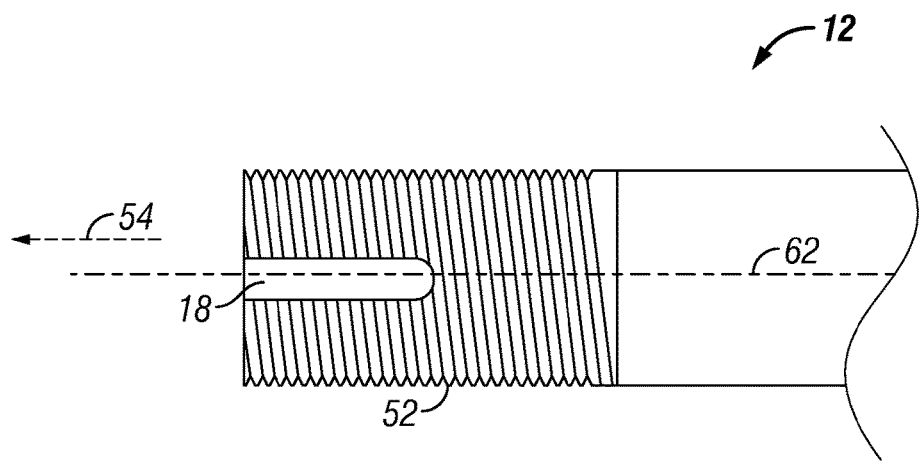
FIG. 3 is a side view of an end portion of an axle.

An end of the axle 12 is shown in FIG. 3 in which a keyway 18 is located at the distal terminal end of the axle 12 which is the outboard most portion of the axle 12 located in the outboard direction 54 that extends away from the centerline of the vehicle to which the axle 12 is included. The keyway 18 may extend completely through a wall of the axle 12, or may extend only partially through the wall of the axle 12. The axle 12 includes external threading 52 on its distal end which also may be located at the terminal end of the axle 12 in the outboard direction 54.

Figure 4:
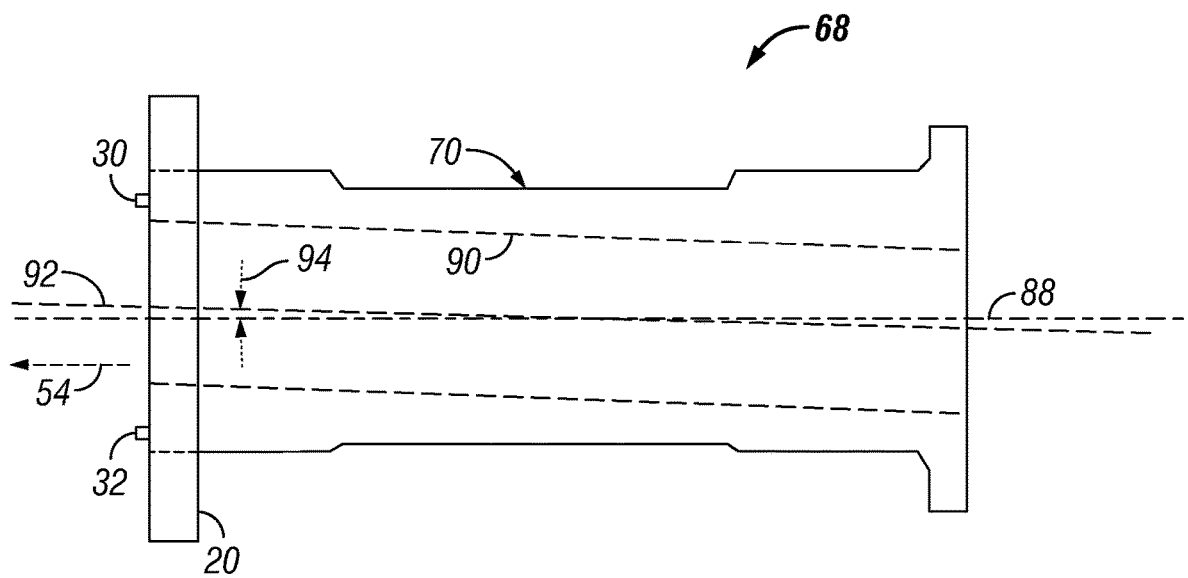
FIG. 4 is a side view of a spindle sleeve.
Figure 5:
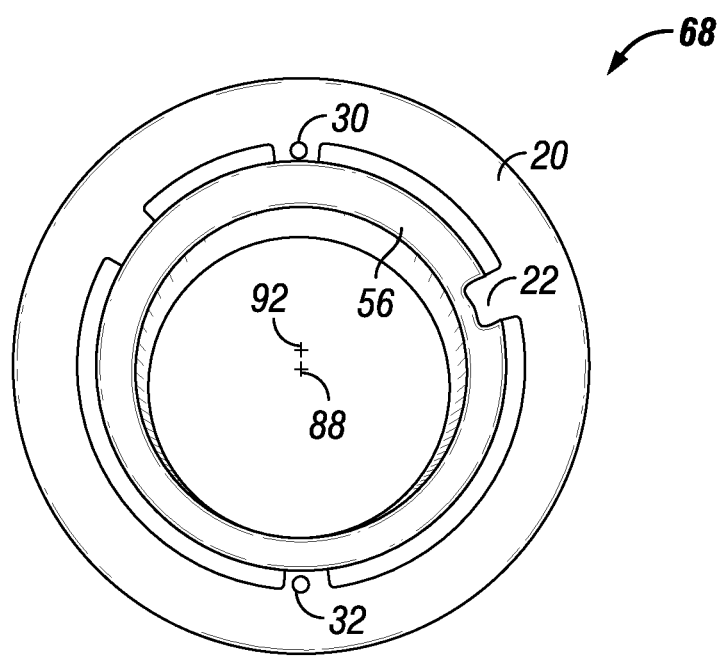
FIG. 5 is a front view of the spindle sleeve of FIG. 4.

An exemplary embodiment of the spindle sleeve 68 is shown with reference to FIGS. 4 and 5. The spindle sleeve 68 may include the spindle sleeve outer surface 70 and spindle sleeve inner surface 90 as previously discussed that include the spindle sleeve outer surface axis 88 and the spindle sleeve inner surface axis 92 oriented to one another at an angle 94. The spindle sleeve may include a sleeve washer 20 located at its terminal end in the outboard direction 54. The sleeve washer 20 extends beyond a body 56 of the spindle sleeve 68 in the radial direction. The sleeve washer 20 may be integrally formed with the body 56, or may be a separate piece that is subsequently attached thereto. A pair of pins 30 and 32 extend from the sleeve washer 20 in the outboard direction 54 and may be the portions of the spindle sleeve 68 located most outboard in the outboard direction 54. The pins 30 and 32 can be oriented 180 degrees about the axis 88. In other arrangements, any number of pins can be supplied, for example from 3-6, from 7-10, or up to 16 pins in other arrangements, and these pins can be oriented at any angle with respect to one another. In some embodiments, the pins may be provided in even numbers and may be located at the same radius from the axis 88. The spindle sleeve 68 has a keyway tab 22 that extends radially inward into the interior space of the spindle sleeve 68 from the sleeve washer 20. Additional tabs may be disposed in a similar manner about the interior of the sleeve washer 20 but may not be used in the same manner as the keyway tab 22. These additional tabs may be used to help attach the sleeve washer 20 to the body 56, or may be used to size the correct diameter of the passageway through the spindle sleeve 68.

Figure 6:
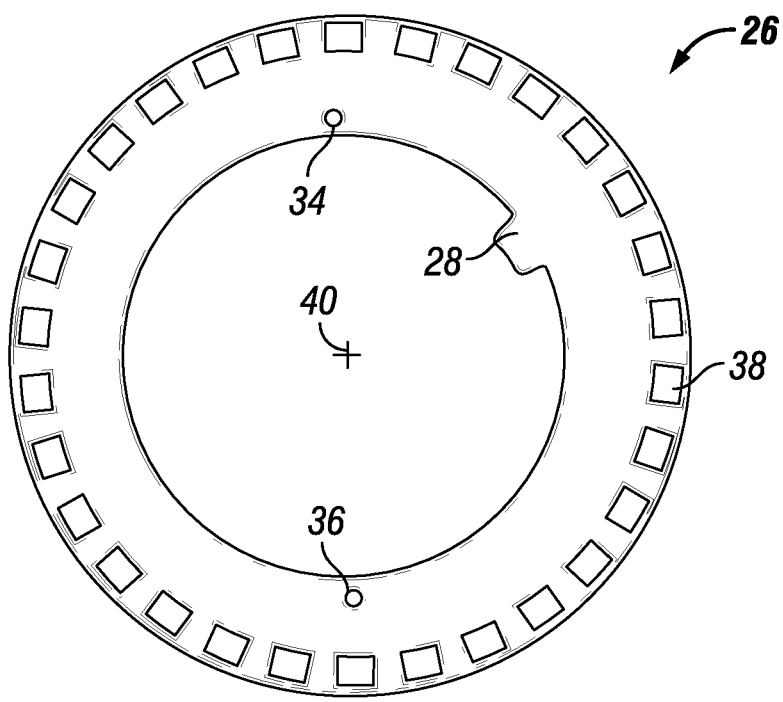
FIG. 6 is a front view of a lock plate.

A lock plate 26 is shown in FIG. 6 and has an aperture through which a lock plate axis 40 extends. A pair of pin apertures 34 and 36 extend part way through the lock plate 26 and are oriented 180 degrees to one another. The pin apertures 34 and 36 are complimentary to the pins 30 and 32 and are configured to receive them within. As such, the pin apertures can be organized in any number or location for receiving the complimentary pins of the sleeve washer 20. The lock plate 26 also has a lock plate tab 28 that extends into the aperture of the lock plate 26. Disposed around the entire circumference of the lock plate 26 is a series of lock plate apertures 38 that are through apertures of the lock plate 26. The lock plate apertures 38 may be of any number, size, and spacing in accordance with various exemplary embodiments.

Figure 7:
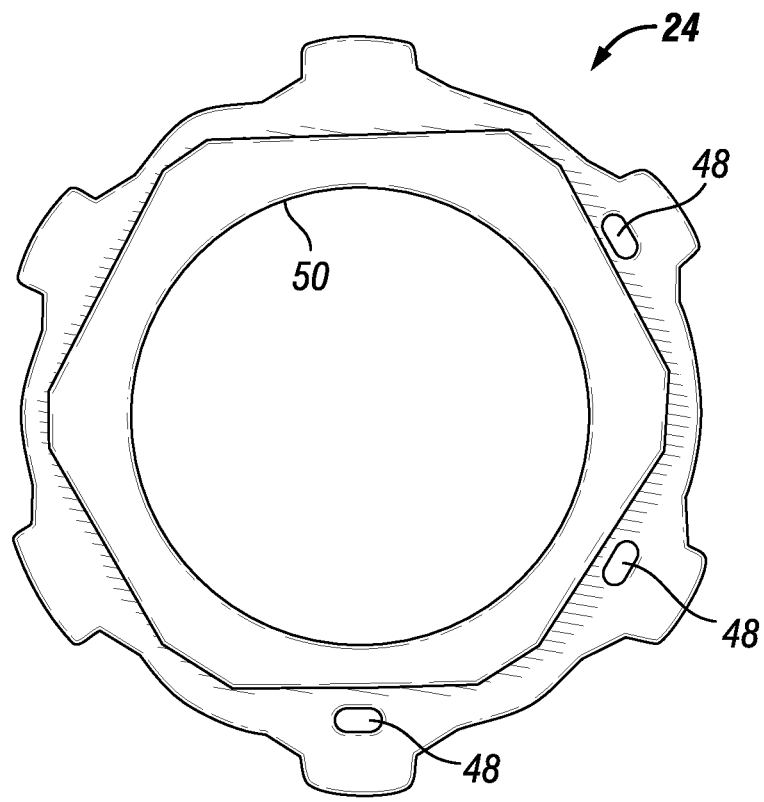
FIG. 7 is a front view of a retaining nut.

A retaining nut 24 of the apparatus 10 is illustrated with reference to FIG. 7. The retaining nut 24 includes a through aperture that is defined by an inner surface. Some or all of the inner surface that defines the through aperture may be provided with internal threading 50. The internal threading 50 may be located at the outboard most side of the retaining nut 24 in the outboard direction 54 and the portions of the through aperture that are at the inboard most side in the outboard direction 54 may not have any internal threading thereon. A series of snap ring apertures 48 can extend through a flange of the retaining nut 24 and may be evenly spaced. The snap ring apertures 48 may all be shaped and sized in a similar manner and any number may be provided in various exemplary embodiments. The retaining nut 24 has a generally hexagonal configuration to allow a wrench or other tightening member to be engaged thereon for turning purposes of the retaining nut 24. Although not visible in the view of FIG. 7, a groove 44 may extend circumferentially all the way around, or partially around, the retaining nut 24 and can be at the base of the hexagonal portion.

Figure 8:
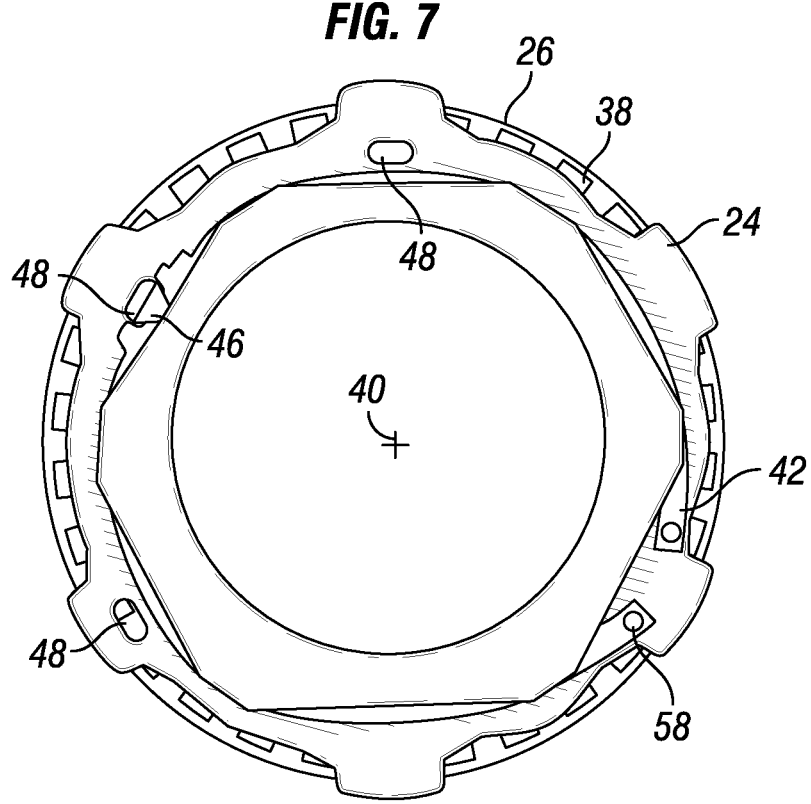
FIG. 8 is a front view of a retaining nut engaged onto a lock plate through the use of a snap ring.

The retaining nut 24 and lock plate 26 may be placed into rotational communication with one another as shown in FIG. 8. The retaining nut 24 is arranged next to and engages the lock plate 26. The quantity of lock plate apertures 38 and the fact that they extend all the way around the lock plate 26, along with the number of snap ring apertures 48 allows at some location for a lock plate aperture 38 to be aligned with a snap ring aperture 48. A snap ring 42 may be located within the groove 44, and a snap ring engagement tab 46 can be inserted through the aligned lock plate aperture 38 and snap ring aperture 48. The snap ring 42 is a generally circular member that has enough flexibility to be expanded radially. One may grasp the handles 58 and pull them radially apart in order to expand the through aperture of the snap ring 42 and fit same over the hexagonal portion of the retaining nut 24. The snap ring 42 may be slid downward to cause the snap ring engagement tab 46 to extend into the aligned snap ring aperture 48 and lock plate aperture 38, and to position the snap ring 42 axially with the groove 44. The expansion force on the handles 58 may be removed in order to allow the snap ring 42 to assume its unbiased position in which it fits tightly in the groove 44 and is retained onto the retaining nut 24. With the snap ring engagement tab 46 disposed within the aligned snap ring aperture 48 and lock plate aperture 38, it may be seen that rotation of the retaining nut 24 about the lock plate axis 40 will necessarily cause the lock plate 26 to rotate as well around the lock plate axis 40 thus placing the retaining nut 24 and the lock plate 26 into rotational communication with one another.

Figure 9:
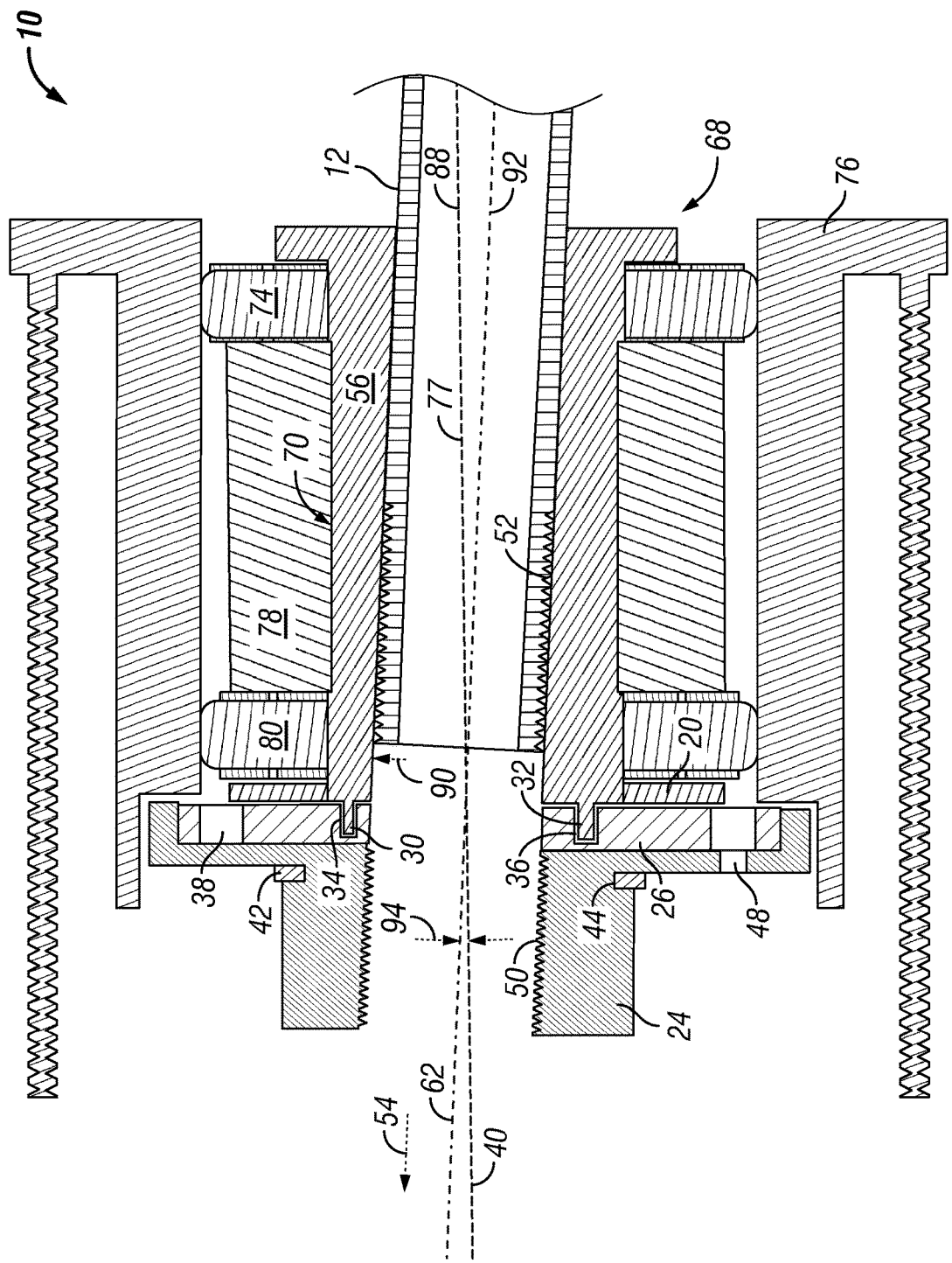
FIG. 9 is a cross sectional view of the assembly in which the spindle sleeve is not keyed to the axle and in which the spindle sleeve, lock plate and retaining nut are in rotating communication.

A cross-sectional view of an assembly of the apparatus 10 is illustrated in FIG. 9. The hub 76 may come pre-packaged with components of the apparatus 10 such as the spindle sleeve 68, lock plate 26, retaining nut 24, bearing spacer 78, and bearings 74 and 80. As the spindle sleeve 68 needs to be appropriately radially located on the axle 12, and as the spindle sleeve 68 may be inaccessible due to its location within the hub 76, a means of rotating the spindle sleeve 68 relative to the axle 12 is provided. The hub 76 may be placed onto the axle 12 as shown. The spindle sleeve 68 engages the axle 12, and the bearings 74, 80 and bearing spacer 78 engage the spindle sleeve outer surface 70. The spindle sleeve 68 is arranged so that the sleeve washer 20 is located outboard of the body 56 in the outboard direction 54. The keyway tab 22 of the sleeve washer 20, and the keyway 18 of the axle 12 are not visible in FIG. 9.

The pins 30, 32 of the sleeve washer 20 are disposed within the pin apertures 34 and 36 of the lock plate 26. The lock plate 26 rests against the sleeve washer 20, and the retaining nut 24 in turn rests against the lock plate 26. The retaining nut 24 and lock plate 26 are placed into rotational communication via the engagement of the snap ring 42 as previously discussed with respect to FIG. 8. As shown, the snap ring 42 is located within the groove 44 of the retaining nut 24. Rotation of the retaining nut 24 will be transmitted to the lock plate 26 as previously discussed via the insertion of the snap ring engagement tab 46 within the lock plate aperture 38 and the snap ring aperture 48. Rotation of the lock plate 26 will be translated to the spindle sleeve 68 via the insertion of the pins 30, 32 into the pin apertures 34, 36. The retaining nut 24 is accessible outside of the hub 76, although the spindle sleeve 68 may not be accessible in the same manner.

Figure 10:
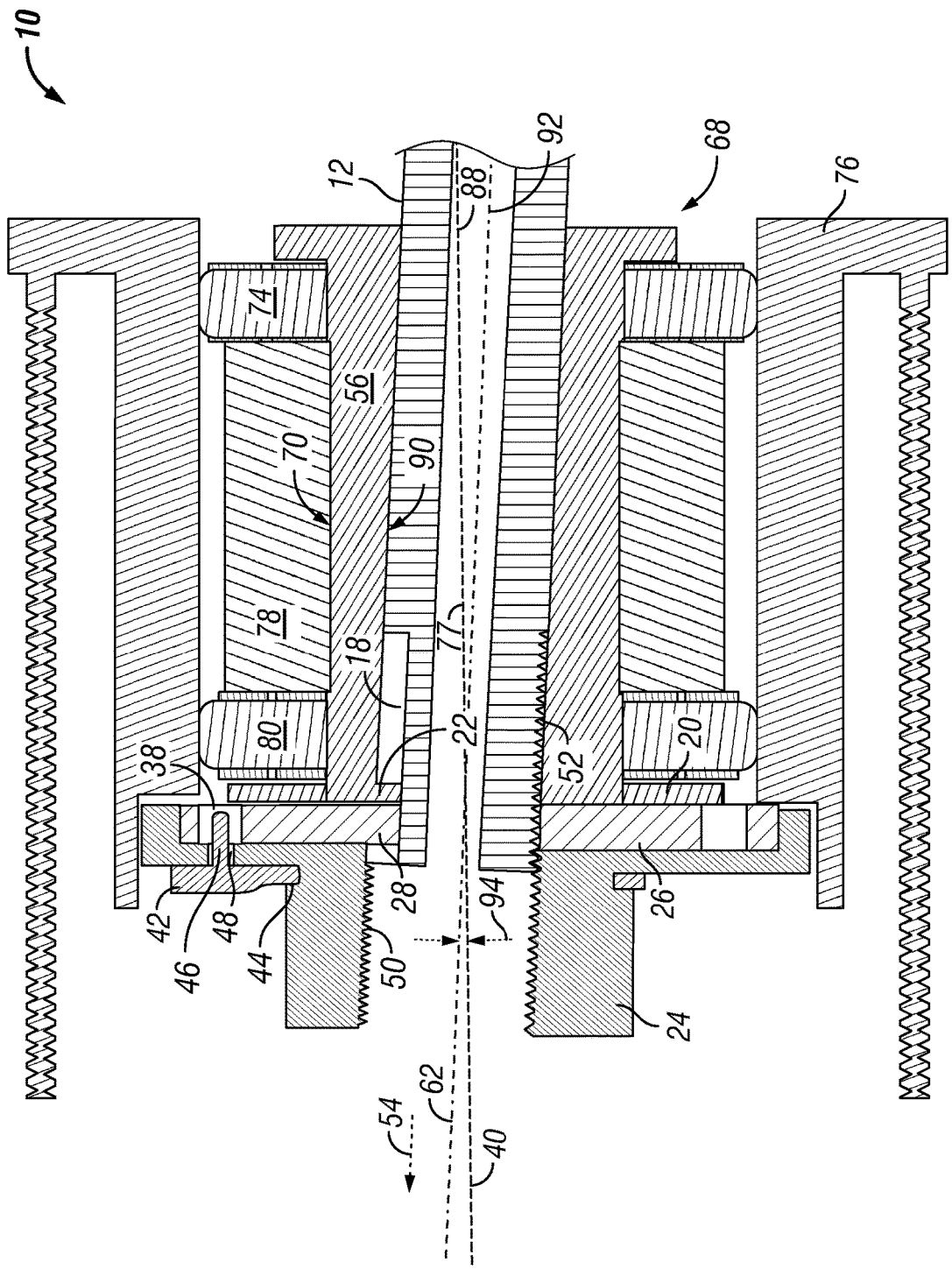
FIG. 10 is a cross sectional view of the assembly in which spindle sleeve is keyed to the axle and in which the retaining nut is not yet threaded onto the axle.

The position of the keyway 18 of the axle 12 is known and thus may be used as a reference point for the positioning of the spindle sleeve 68 onto the axle 12 so that the correct camber and/or toe correction can be achieved. The keyway tab 22 of the sleeve washer 20 may be used to effect proper rotational alignment of the spindle sleeve 68 in this manner. The retaining nut 24 can be rotated until the keyway tab 22 is located within the keyway 18 of the axle 12 to ensure the spindle sleeve 68 is properly rotationally positioned on the axle 12. FIG. 10 shows the keyway tab 22 inserted into the keyway 18. The lock plate tab 28 is against the keyway tab 22 and is likewise placed into the keyway 18. Due to the fact the keyway tab 22 and lock plate tab 28 are inserted into the keyway 18, it is not possible to rotate the spindle sleeve 68 or the lock plate 26 relative to the axle 12. The snap ring engagement tab 46 extends through the snap ring aperture 48 and into the lock plate aperture 38, and the snap ring 42 is disposed within the groove 44 to retain the snap ring 42 to the retaining nut 24. The internal threading 50 of the retaining nut 24 is not engaged onto the external threading 52 at this point. The user may apply force to the retaining nut 24 in the direction along axis 62 in order to slide the retaining nut 24, lock plate 26, and spindle sleeve 68 inboard to move the threading 50 and 52 against one another.

Figure 11:
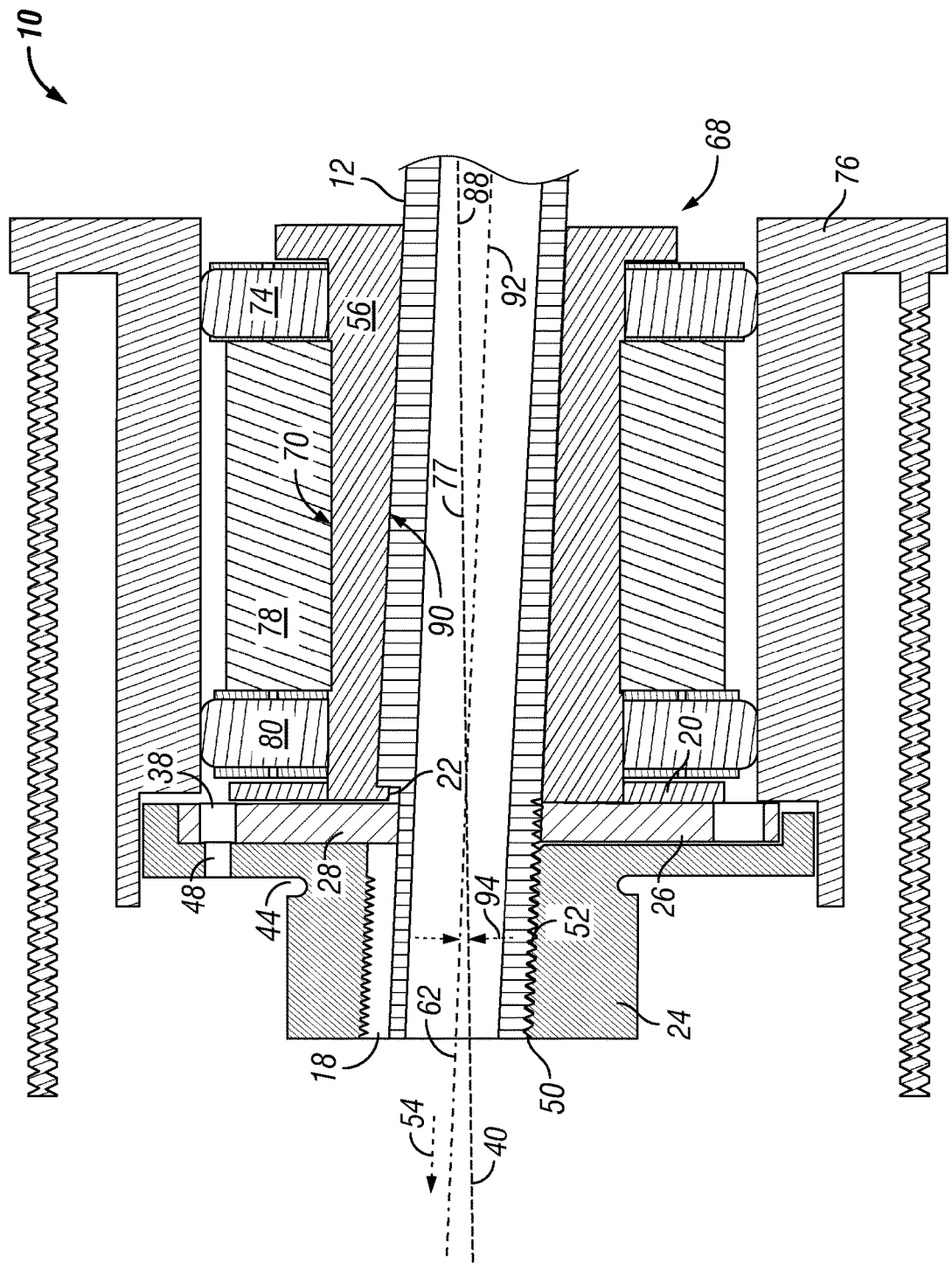
FIG. 11 is a cross sectional view in which the retaining nut is threaded onto the axle and in which the lock plate and the spindle sleeve are not in rotating communication with the retaining nut.

FIG. 11 shows the next step of the process in which the spindle sleeve 68 is removed from rotational communication with the retaining nut 24. In order to do so, the snap ring 42 is removed from the retaining nut 24. This removal necessarily causes the snap ring engagement tab 46 to be removed from the lock plate aperture 38 and the snap ring aperture 48. The retaining nut 24 is no longer in rotational communication with the lock plate 26. In turn, the retaining nut 24 is no longer in rotational communication with the spindle sleeve 68. The spindle sleeve 68 and the lock plate 26 may still be in rotational communication with one another, however, in the arrangement due to the interaction of the pins 30, 32 and the pin apertures 34, 36. Rotation of the retaining nut 24 causes the internal threading 50 to engage the external threading 52 to cause the axle 12 to move outboard relative to the hub 76 and other components. Continued rotation of the retaining nut 24 likewise causes the lock plate 26 and the spindle sleeve 68 to tighten together and move inboard in the direction of the lock plate axis 40. The keyway tab 22 and lock plate tab 28 can move along the keyway 18 until the keyway tab 22 engages the wall of the axle 12, or until some other portion of the apparatus 10 engages a non-moving portion of the vehicle with respect to the tightening forces.

Once the retaining nut 24 has been tightened into its secured position, the snap ring 42 can be reinserted back onto the retaining nut 24 so that the snap ring engagement tab 46 can again be inserted into the aligned snap ring aperture 48 and the lock plate aperture 38. This will again place the retaining nut 24 into rotational communication with the spindle sleeve 68 via the lock plate 26. Since the spindle sleeve 68 is keyed to the axle 12, the spindle sleeve 68 and hence the retaining nut 24 will not rotate relative to the axle 12. The snap ring 42 thus functions to prevent the retaining nut 24 from backing off of the axle 12 and loosening the connection as may occur from driving forces imparted by the vehicle's travel.

Although described as being incorporated into a hub 76 prepackaged with the spindle sleeve 68, bearings 74 and 80, and retaining nut 24, it is to be understood that the rotational alignment mechanism provided may be used in assemblies that are not prepackaged in accordance with other exemplary embodiments. Further, although described as incorporating the use of a lock plate 26, it is to be understood that other versions of the apparatus 10 are possible in which the lock plate 26 is not present, and in which the spindle sleeve 68 is placed into and out of rotational communication with the retaining nut 24.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An apparatus for a vehicle, comprising:
   an axle, wherein the axle has an axis, wherein the axle has a keyway;
   a spindle sleeve with a spindle sleeve inner surface axis that is coaxial with the axis of the axle, wherein the spindle sleeve has a spindle sleeve outer surface axis that is not coaxial with the axis of the axle, wherein the spindle sleeve has a sleeve washer that has a keyway tab; and a retaining nut in selective rotating communication with the sleeve washer such that rotation of the retaining nut is communicated to the sleeve washer to cause the spindle sleeve to rotate relative to the axle when the retaining nut is in rotating communication with the sleeve washer, wherein rotation of the retaining nut is not communicated to the sleeve washer to cause the spindle sleeve to rotate relative to the axle when the retaining nut is not in rotating communication with the sleeve washer.

2. The apparatus as set forth in claim 1, further comprising a lock plate that engages the sleeve washer, wherein rotation of the retaining nut is communicated to the sleeve washer through the lock plate to cause the spindle sleeve and the lock plate to rotate relative to the axle when the retaining nut is in rotating communication with the sleeve washer.

3. The apparatus as set forth in claim 2, wherein the lock plate has a lock plate tab, wherein the keyway tab of the sleeve washer and the lock plate tab are both located within the keyway of the axle when the retaining nut is not in rotating communication with the sleeve washer.

4. The apparatus as set forth in claim 2, wherein the sleeve washer has a pair of pins located 180 degrees from one another, wherein the lock plate has a pair of pin apertures located 180 degrees from one another, wherein the pair of pins are disposed within the pair of pin apertures in order to cause rotation of the lock plate to be communicated to the sleeve washer.

5. The apparatus as set forth in claim 2, wherein the lock plate has a plurality of lock plate apertures disposed 360 degrees about a lock plate axis, wherein the lock plate apertures extend completely through the lock plate.

6. The apparatus as set forth in claim 1, further comprising a snap ring that engages the retaining nut when the retaining nut is in rotating communication with the sleeve washer, wherein the retaining nut has a groove into which the snap ring is disposed when the snap ring engages the retaining nut, wherein the snap ring has a snap ring engagement tab.

7. The apparatus as set forth in claim 1, wherein the retaining nut defines a plurality of snap ring apertures, wherein a snap ring engagement tab is disposed through one of the plurality of snap ring apertures.

8. The apparatus as set forth in claim 5, further comprising a snap ring that engages the retaining nut when the retaining nut is in rotating communication with the sleeve washer, wherein the retaining nut defines a snap ring aperture, wherein a snap ring engagement tab is disposed through the snap ring aperture when the retaining nut is in rotating communication with the sleeve washer, wherein the snap ring engagement tab is disposed within one of the plurality of lock plate apertures and engages the lock plate when the retaining nut is in rotating communication with the sleeve washer.

9. The apparatus as set forth in claim 1, wherein the retaining nut has internal threading that engages complimentary external threading of the axle, wherein rotation of the retaining nut on the external threading of the axle causes axial force to be imparted onto the sleeve washer when the retaining nut is not in rotating communication with the sleeve washer.

10. The apparatus as set forth in claim 1, further comprising a hub, wherein the hub, the spindle sleeve, and the retaining nut are prepackaged for assembly onto the axle.

11. The apparatus as set forth in claim 1, further comprising a hub that is mounted onto the spindle sleeve, wherein the hub extends farther outboard than the spindle sleeve when the spindle sleeve is mounted onto the axle.

12. The apparatus as set forth in claim 1, wherein the keyway tab extends closer to the spindle sleeve inner surface axis than a spindle sleeve inner surface of the spindle sleeve, wherein the sleeve washer extends farther from the spindle sleeve outer surface axis than a spindle sleeve outer surface of the spindle sleeve.

13. The apparatus as set forth in claim 1, wherein the spindle sleeve has a body, wherein the sleeve washer and the spindle sleeve and the keyway tab are all formed as a single piece.

* * * * *